United States Patent
Endo et al.

(10) Patent No.: US 11,948,449 B2
(45) Date of Patent: Apr. 2, 2024

(54) VIBRATION DEVICE AND ELECTRONIC EQUIPMENT

(71) Applicant: Murata Manufacturing Co., Ltd., Nagaokakyo (JP)

(72) Inventors: Jun Endo, Nagaokakyo (JP); Shozo Otera, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 91 days.

(21) Appl. No.: 17/863,632

(22) Filed: Jul. 13, 2022

(65) Prior Publication Data

US 2022/0343742 A1 Oct. 27, 2022

Related U.S. Application Data

(63) Continuation of application No. PCT/JP2021/023530, filed on Jun. 22, 2021.

(30) Foreign Application Priority Data

Jun. 23, 2020 (JP) ................................. 2020-107755

(51) Int. Cl.
*G08B 6/00* (2006.01)
*B06B 1/02* (2006.01)
*B06B 1/06* (2006.01)

(52) U.S. Cl.
CPC .............. *G08B 6/00* (2013.01); *B06B 1/0207* (2013.01); *B06B 1/0688* (2013.01)

(58) Field of Classification Search
CPC ...... G06F 3/016; B06B 1/0207; B06B 1/0688
See application file for complete search history.

(56) References Cited

U.S. PATENT DOCUMENTS

| | | | | |
|---|---|---|---|---|
| 11,323,045 B2* | 5/2022 | Endo | ...................... | H02N 2/004 |
| 11,455,038 B2* | 9/2022 | Hashimoto | .............. | G06F 3/016 |
| 11,556,177 B2* | 1/2023 | Tominaga | ............... | H10N 30/20 |
| 11,605,272 B2* | 3/2023 | Nakao | ....................... | G08B 6/00 |
| 2019/0155391 A1 | 5/2019 | Hashimoto et al. | | |
| 2019/0286238 A1 | 9/2019 | Yahata et al. | | |

FOREIGN PATENT DOCUMENTS

| | | |
|---|---|---|
| JP | 2016071451 A | 5/2016 |
| JP | 2019096336 A | 6/2019 |
| WO | 2016027667 A1 | 2/2016 |
| WO | 2018079339 A1 | 5/2018 |
| WO | 2019013164 A | 1/2019 |

OTHER PUBLICATIONS

International Search Report issued for PCT/JP2021/023530, dated Sep. 21, 2021.

* cited by examiner

*Primary Examiner* — John A Tweel, Jr.
(74) *Attorney, Agent, or Firm* — ArentFox Schiff LLP

(57) ABSTRACT

A vibration device that includes: a fixing part having a flat plate shape; a vibration part having a flat plate shape, the vibration part being disposed around the fixing part as viewed in a normal direction of the fixing part; a coupling part that couples the vibration part and the fixing part and is constructed to elastically deform, the vibration part constructed to be displaced in an orthogonal direction orthogonal to the normal direction of the fixing part with respect to the fixing part; and a vibration film fixed to the vibration part and the fixing part, the vibration film constructed to vibrate the vibration part in the orthogonal direction with respect to the fixing part when an electric signal is applied to the vibration film.

15 Claims, 6 Drawing Sheets

VIBRATION DEVICE AND ELECTRONIC EQUIPMENT

CROSS REFERENCE TO RELATED APPLICATIONS

The present application is a continuation of International application No. PCT/JP2021/023530, filed Jun. 22, 2021, which claims priority to Japanese Patent Application No. 2020-107755, filed Jun. 23, 2020, the entire contents of each of which are incorporated herein by reference.

FIELD OF THE INVENTION

The present invention relates to a vibration device that generates vibration and electronic equipment.

BACKGROUND OF THE INVENTION

In recent years, there has been proposed a tactile sense presentation device that transmits vibration to a user when the user performs a pushing operation in input equipment such as a touch panel which allows the user to feel that the user has performed the pushing operation.

For example, Patent Document 1 proposes a tactile sense presentation device that provides tactile sense feedback to a user with a piezoelectric film. When a voltage is applied to the piezoelectric film, the piezoelectric film stretches and contracts in a direction (plane direction) in which the piezoelectric film spreads. When the piezoelectric film stretches and contracts in the plane direction, a vibration part connected to the piezoelectric film vibrates in the plane direction.

Patent Document 1: WO 2019/013164 A

SUMMARY OF THE INVENTION

Meanwhile, in the tactile sense presentation device described in Patent Document 1, there is a demand for more efficiently transmitting vibration to the user.

An object of the present invention is to provide a vibration device capable of more efficiently transmitting vibration to a user and electronic equipment.

A vibration device according to an aspect of the present invention includes: a fixing part having a flat plate shape; a vibration part having a flat plate shape, the vibration part being disposed around the fixing part as viewed in a normal direction of the fixing part; a coupling part that couples the vibration part and the fixing part and is constructed to elastically deform, the vibration part constructed to be displaced in an orthogonal direction orthogonal to the normal direction of the fixing part with respect to the fixing part; and a vibration film fixed to the vibration part and the fixing part, the vibration film constructed to vibrate the vibration part in the orthogonal direction with respect to the fixing part when an electric signal is applied to the vibration film.

Electronic equipment according to an aspect of the present invention includes: an electronic equipment body; an operation target; and a vibration device, wherein the vibration device includes: a fixing part that is fixed to the electronic equipment body and has a flat plate shape; a vibration part that is fixed to the operation target and has a flat plate shape, the vibration part being disposed around the fixing part as viewed in a normal direction of the fixing part; a coupling part that couples the vibration part and the fixing part and is constructed to elastically deform, the vibration part constructed to be displaced in an orthogonal direction orthogonal to the normal direction of the fixing part with respect to the fixing part; and a vibration film fixed to the vibration part and the fixing part, the vibration film constructed to vibrate the vibration part in the orthogonal direction with respect to the fixing part when an electric signal is applied to the vibration film.

In the present specification, an axis or member extending in a front-back direction does not necessarily indicate only an axis or member parallel to the front-back direction. The axis or member extending in the front-back direction is an axis or member inclined within a range of ±45° with respect to the front-back direction. Similarly, an axis or a member extending in an up-down direction is an axis or member inclined within a range of ±45° with respect to the up-down direction. An axis or member extending in a left-right direction is an axis or member inclined within a range of ±45° with respect to the left-right direction.

Hereinafter, a first member, a second member, and a third member are structures included in the electronic equipment and the vibration device. In the present specification, the first member being supported by the second member includes a case where the first member is attached to the second member so as not to be movable with respect to the second member (that is, it is fixed or held) and a case where the first member is attached to the second member so as to be movable with respect to the second member. That the first member being supported by the second member includes both a case where the first member is directly attached to the second member and a case where the first member is attached to the second member by using the third member.

In the present specification, the first member and the second member being arranged in the front-back direction refers to the following state. When the first member and the second member are viewed in a direction perpendicular to the front-back direction, both the first member and the second member are disposed on a straight line indicating the front-back direction. In the present specification, the first member and the second member being arranged in the front-back direction when viewed in the up-down direction refers to the following state. When the first member and the second member are viewed in the up-down direction, both the first member and the second member are disposed on a straight line indicating the front-back direction. In this case, when the first member and the second member are viewed from the left-right direction different from the up-down direction, one of the first member and the second member does not have to be disposed on a straight line indicating the front-back direction. The first member and the second member may be in contact with each other. The first member and the second member may be separated from each other. A third member may be present between the first member and the second member. This definition also applies to directions other than the front-back direction.

In the present specification, the first member being disposed in front of the second member refers to the following state. A part of the first member is disposed in a region through which the second member passes when moving in parallel in the front direction. Therefore, the first member may be accommodated in the region through which the second member passes when moving parallel in the front direction or may protrude from the region through which the second member passes when moving parallel in the front direction. In this case, the first member and the second member are arranged in the front-back direction. This definition also applies to directions other than the front-back direction.

In the present specification, the first member being disposed in front of the second member when viewed in the left-right direction refers to the following state. When viewed in the left-right direction, the first member and the second member are arranged in the front-back direction, and when viewed in the left-right direction, a portion of the first member facing the second member is disposed in front of the second member. In this definition, the first member and the second member does not have to be arranged in the front-back direction in three dimensions. This definition also applies to directions other than the front-back direction.

In the present specification, the first member being disposed at a position in front of the second member refers to the following state. The first member is disposed in front of a plane passing through the front end of the second member and orthogonal to the front-back direction. In this case, the first member and the second member may be arranged in the front-back direction and does not have to be arranged in the front-back direction. This definition also applies to directions other than the front-back direction.

In the present specification, each part of the first member is defined as follows unless otherwise specified. A front part of the first member means the front half of the first member. A back part of the first member means the back half of the first member. A left part of the first member means the left half of the first member. A right part of the first member means the right half of the first member. An upper part of the first member means the upper half of the first member. A lower part of the first member means the lower half of the first member. A front end of the first member means the end of the first member in the forward direction. A back end of the first member means the end of the first member in the backward direction. A left end of the first member means the end of the first member in the leftward direction. A right end of the first member means the end of the first member in the rightward direction. An upper end of the first member means the end of the first member in the upward direction. A lower end of the first member means the end of the first member in the downward direction. An upper end part of the first member means the front end of the first member and the vicinity thereof. A back end part of the first member means the back end of the first member and the vicinity thereof. A left end part of the first member means the left end of the first member and the vicinity thereof. A right end part of the first member means the right end of the first member and the vicinity thereof. An upper end part of the first member means the upper end of the first member and the vicinity thereof. A lower end part of the first member means the lower end of the first member and the vicinity thereof.

The present invention can transmit vibration to a user more efficiently.

BRIEF EXPLANATION OF THE DRAWINGS

FIG. 6 is an exploded perspective view of electronic equipment 1a including a vibration device 20a.

DETAILED DESCRIPTION OF THE INVENTION

[Structure of Vibration Device]

Figure 1:
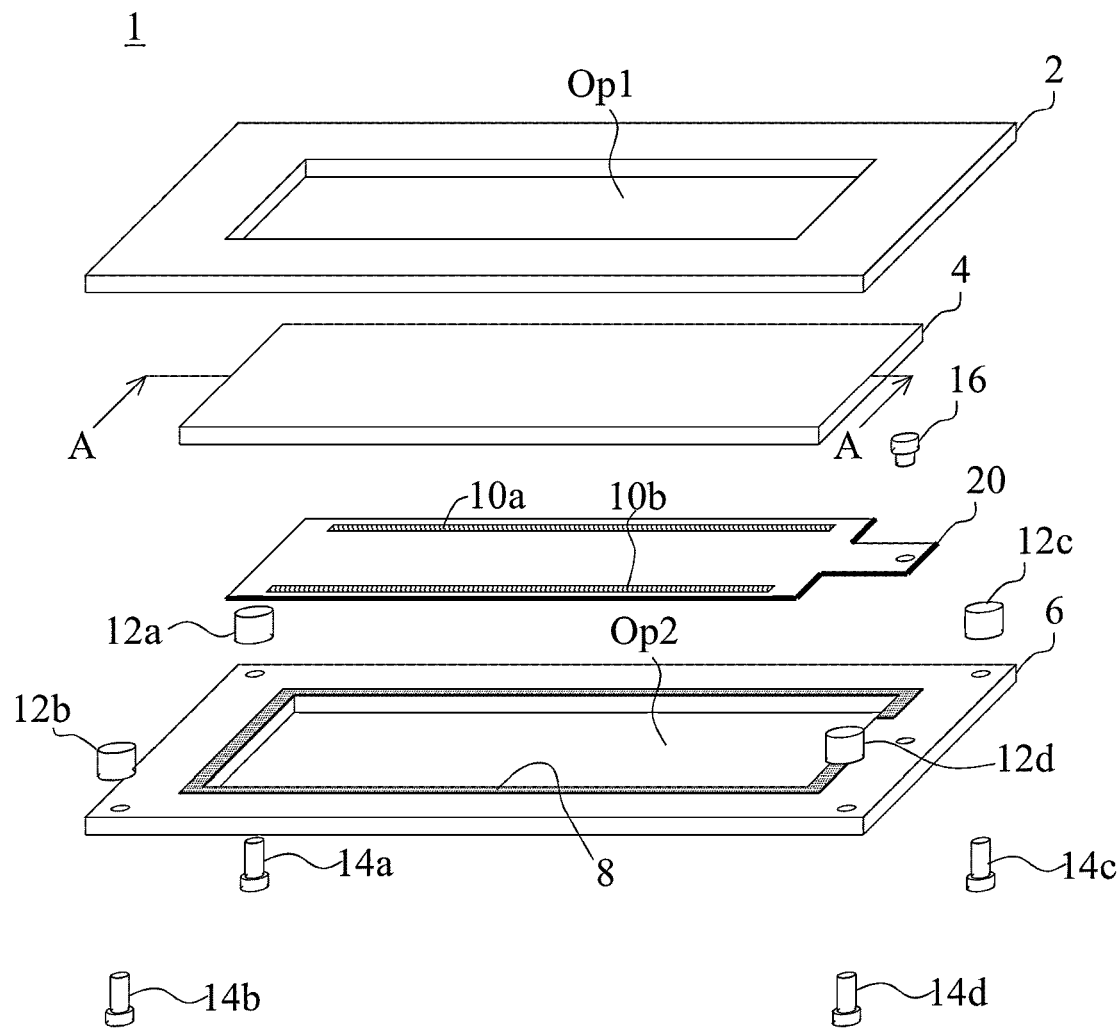
FIG. 1 is an exploded perspective view of electronic equipment 1 including a vibration device 20.
Figure 1:
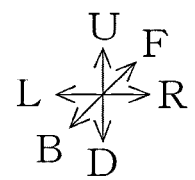
Figure 2:
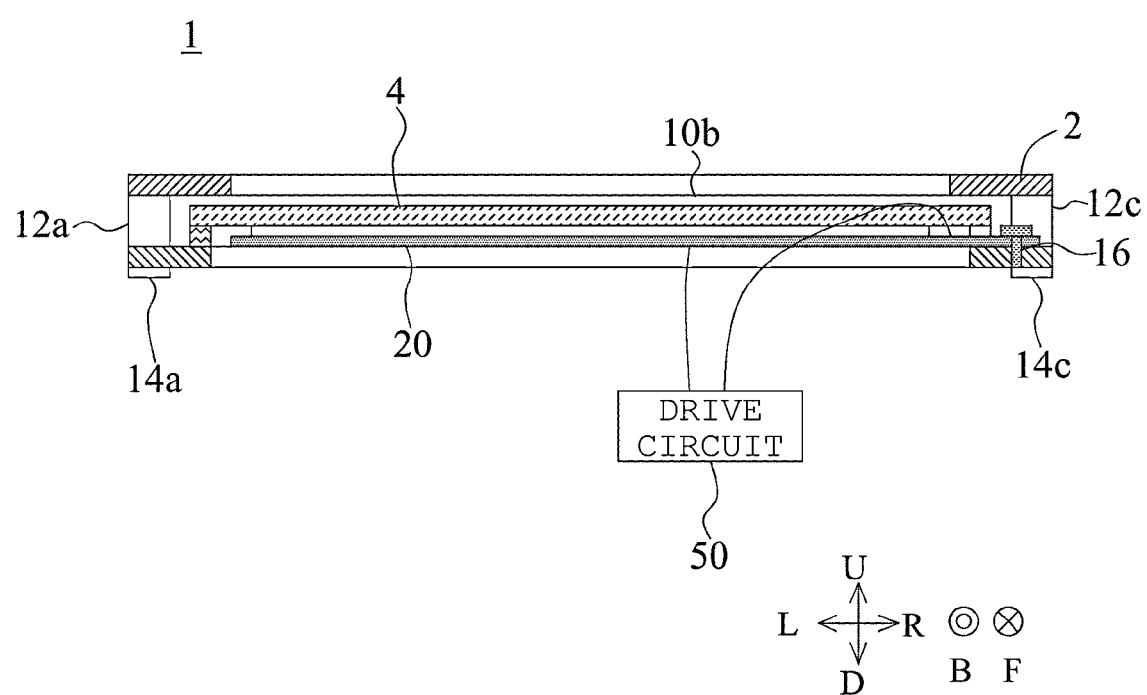
FIG. 2 is a sectional view taken along the line A-A in FIG. 1.
Figure 3:
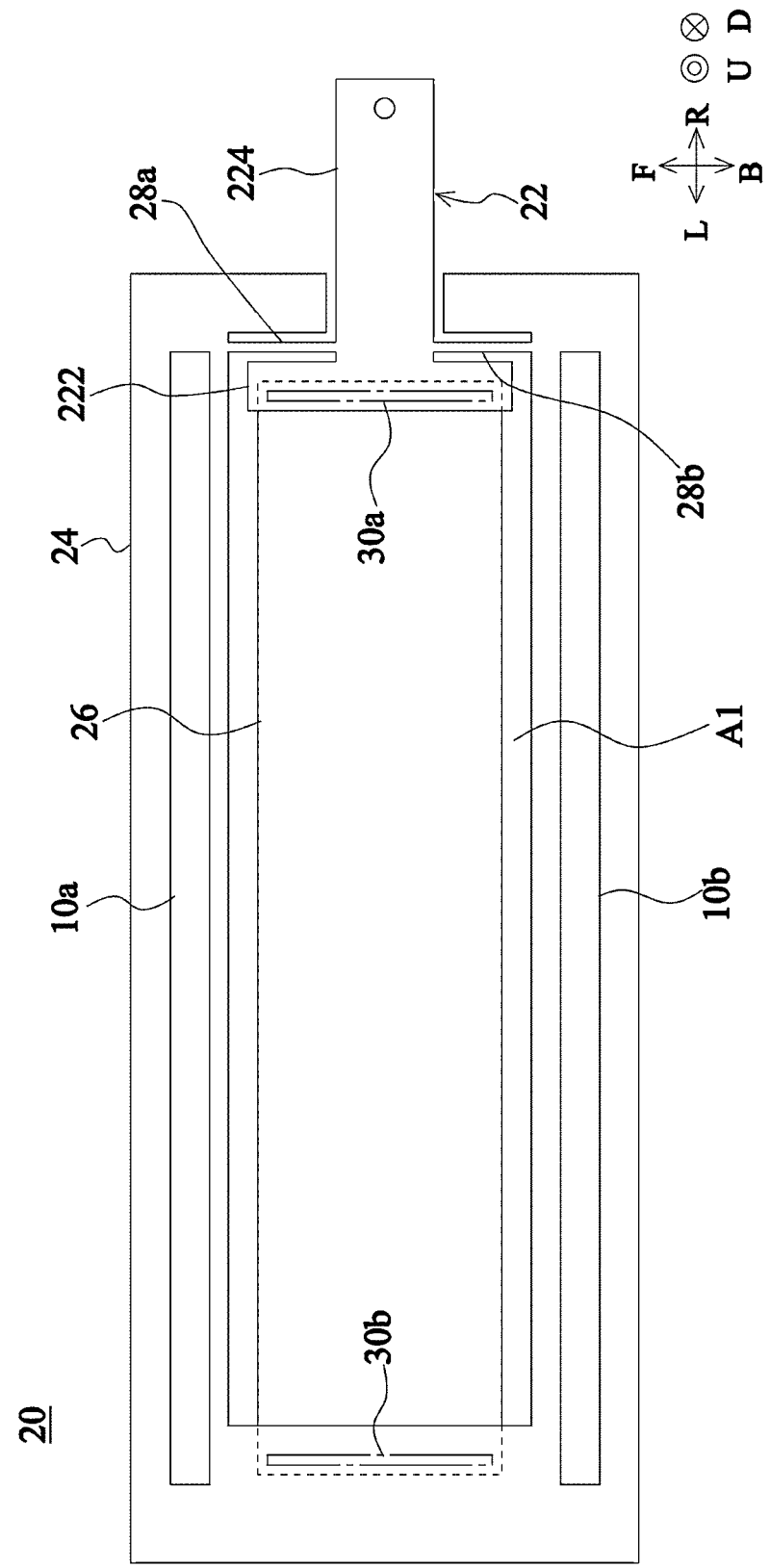
FIG. 3 is a top view of the vibration device 20.
Figure 4:
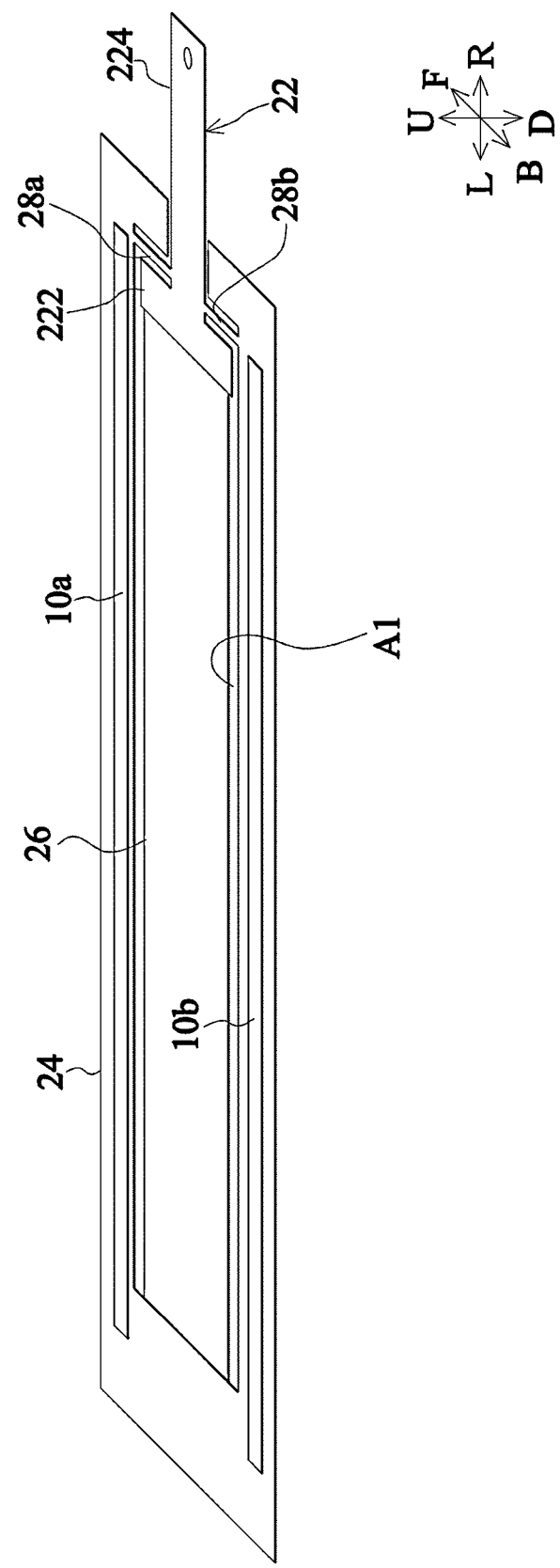
FIG. 4 is a perspective view of the vibration device 20.
Figure 5:
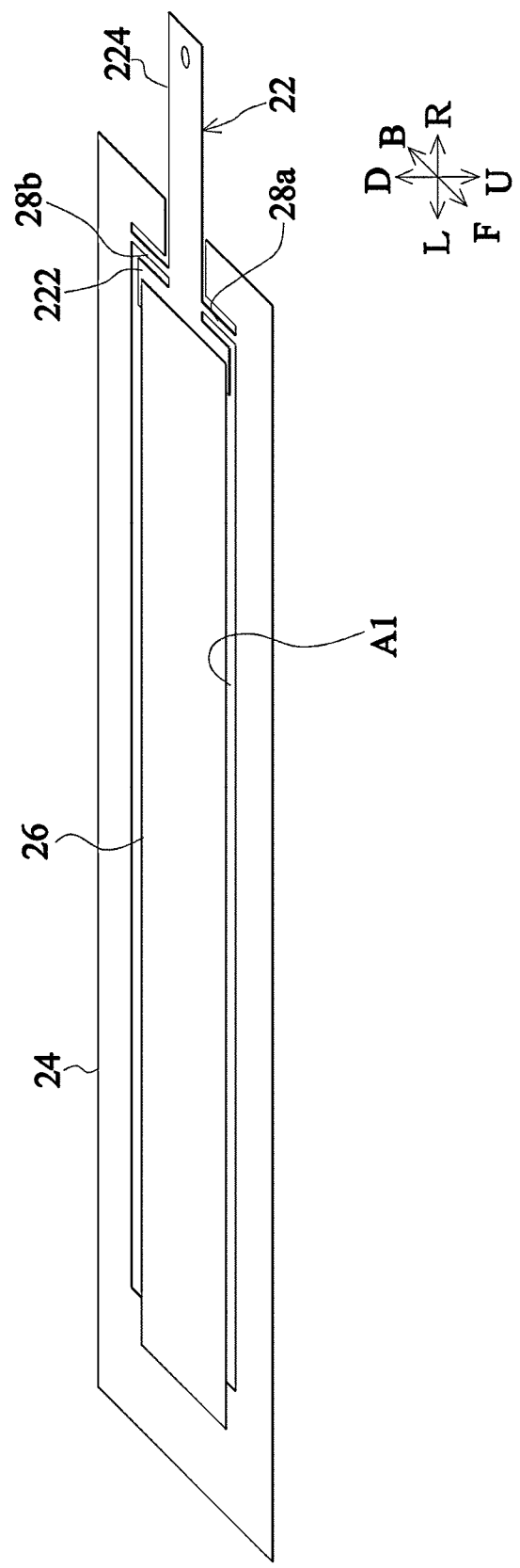
FIG. 5 is a perspective view of the vibration device 20.

Hereinafter, a structure of a vibration device 20 according to an embodiment of the present invention will be described with reference to the drawings. FIG. 1 is an exploded perspective view of electronic equipment 1 including the vibration device 20. FIG. 2 is a sectional view taken along the line A-A in FIG. 1. FIG. 3 is a top view of the vibration device 20. FIGS. 4 and 5 are perspective views of the vibration device 20.

In the present specification, directions are defined as follows. The normal direction of a fixing part 22 (see FIG. 3) having a flat plate shape is defined as an up-down direction. The vibration device 20 has a rectangular shape as viewed in the up-down direction. The direction in which a long side of the vibration device 20 extends is defined as a left-right direction. The direction in which a short side of the vibration device 20 extends is defined as a front-back direction. The up-down direction, the left-right direction, and the front-back direction are orthogonal to each other. Note that the definition of the directions in the present specification is an example. Therefore, the directions at the time of actual use of the electronic equipment 1 and the vibration device 20 do not need to coincide with the directions in the present specification. The up-down direction may be reversed in FIG. 1. Similarly, the left-right direction may be reversed in FIG. 1. The front-back direction may be reversed in FIG. 1.

The electronic equipment 1 is, for example, a personal computer. FIG. 1 illustrates the vicinity of a touch pad type input device of a personal computer. As illustrated in FIGS. 1 and 2, the electronic equipment 1 includes an electronic equipment body 2, an operation target 4, an electronic equipment body 6, a cushion material 8, adhesive members 10a, 10b, spacers 12a to 12d, screws 14a to 14d, 16, and a drive circuit 50 (see FIG. 2).

The operation target 4 is a member that a part of a user's body touches for operating the electronic equipment 1. The part of the user's body is, for example, a finger. The operation target 4 is a touch pad type input device. The operation target 4 has a flat plate shape. The operation target 4 has a rectangular shape having long sides extending in the left-right direction as viewed in the up-down direction. However, the shape of the operation target 4 is not limited to a rectangular shape. The user can operate the electronic equipment 1 by touching the operation target 4 or pressing the operation target 4 in the downward direction.

The electronic equipment body 2 is a palm rest of the electronic equipment 1. The palm rest is a part that a palm of a user touches when the user operates a keyboard or the touch pad type input device. The electronic equipment body 2 is disposed on the operation target 4. The electronic equipment body 2 has a flat plate shape. The electronic equipment body 2 is provided with an opening Op1 having a rectangular shape and extending in the left-right direction as viewed in the up-down direction. The opening Op1 overlaps the operation target 4 as viewed in the up-down direction. The length of each long side of the opening Op1 is slightly shorter than the length of each long side of the operation target 4. The length of each short side of the opening Op1 is slightly shorter than the length of each short side of the operation target 4. Therefore, a part of the operation target 4 is exposed from the electronic equipment body 2 via the opening Op1. The electronic equipment body 2 is made of steel use stainless (SUS), for example. The electronic equipment body 2 may be made of resin, for example.

The electronic equipment body 6 is a holder of the vibration device 20 described later. Therefore, the electronic equipment body 6 supports the vibration device 20. The electronic equipment body 6 is disposed under the operation target 4. The electronic equipment body 6 has a flat plate shape. The electronic equipment body 6 has a rectangular shape having long sides extending in the left-right direction as viewed in the up-down direction. The electronic equipment body 6 is provided with an opening Op2 having a rectangular shape and extending in the left-right direction as viewed in the up-down direction. The opening Op2 overlaps the operation target 4 as viewed in the up-down direction. The length of each long side of the opening Op2 is slightly shorter than the length of each long side of the operation target 4. The length of each short side of the opening Op2 is slightly shorter than the length of each short side of the operation target 4. Therefore, the operation target 4 protrudes in the up-down direction and the left-right direction from the opening Op2 as viewed in the up-down direction. Thus, the electronic equipment body 6 surrounds at least a part of the operation target 4 as viewed in the up-down direction (normal direction of fixing part 22). The electronic equipment body 6 is made of steel use stainless (SUS), for example.

The cushion material 8 is provided on an upper main face of the electronic equipment body 6. Therefore, the cushion material 8 is disposed under the operation target 4. The cushion material 8 has a shape along the outer edge of the opening Op2 as viewed in the up-down direction. Therefore, the cushion material 8 has a rectangular frame shape as viewed in the up-down direction. The vicinity of the center of the right side of the cushion material 8 is cut out. The cushion material 8 overlaps the outer edge part of the operation target 4 as viewed in the up-down direction. The operation target 4 is placed on the electronic equipment body 6 with the cushion material 8 interposed therebetween. The cushion material 8 is, for example, a pressure-sensitive adhesive. The cushion material 8 is made of a material that easily deforms when the cushion material 8 receives an external force. As a result, the operation target 4 is not strongly restrained with respect to the electronic equipment body 6 and is fixed to the electronic equipment body 6 in a state of easily vibrating.

The spacers 12a to 12d are members for keeping a distance in the up-down direction between the electronic equipment body 2 and the electronic equipment body 6 constant. Each of the spacers 12a to 12d has a circular column shape having a central axis extending in the up-down direction. The spacer 12a is disposed at the left front corner of the electronic equipment bodies 2 and 6 as viewed in the up-down direction. The spacer 12b is disposed at the left back corner of the electronic equipment bodies 2 and 6 as viewed in the up-down direction. The spacer 12c is disposed at the right front corner of the electronic equipment bodies 2 and 6 as viewed in the up-down direction. The spacer 12d is disposed at the right back corner of the electronic equipment bodies 2 and 6 as viewed in the up-down direction.

The screw 14a fixes the electronic equipment body 2, the electronic equipment body 6, and the spacer 12a. The screw 14b fixes the electronic equipment body 2, the electronic equipment body 6, and the spacer 12b. The screw 14c fixes the electronic equipment body 2, the electronic equipment body 6, and the spacer 12c. The screw 14d fixes the electronic equipment body 2, the electronic equipment body 6, and the spacer 12d.

The vibration device 20 is used in the electronic equipment 1. The vibration device 20 vibrates the operation target 4. The vibration device 20 is disposed under the operation target 4. The vibration device 20 is fixed to the operation target 4. As illustrated in FIGS. 3 to 5, the vibration device 20 includes the fixing part 22, a vibration part 24, a vibration film 26, and coupling parts 28a, 28b.

The fixing part 22 is fixed to the electronic equipment body 6 and has a flat plate shape. The fixing part 22 has an upper main face and a lower main face. The fixing part 22 has a T shape. Specifically, the fixing part 22 includes a fixing part body 222 and a fixing part protrusion 224. The fixing part body 222 has a rectangular shape having long sides extending in the front-back direction as viewed in the up-down direction. The fixing part protrusion 224 has a rectangular shape having long sides extending in the left-right direction as viewed in the up-down direction. The left end of the fixing part protrusion 224 is connected to the center of the fixing part body 222 in the front-back direction.

The fixing part protrusion 224 is fixed to the electronic equipment body 6. Specifically, the fixing part protrusion 224 is fixed to the electronic equipment body 6 by a screw 16. A double-sided tape may be used instead of the screw 16 to fix the fixing part protrusion 224.

The vibration part 24 has a flat plate shape. The vibration part 24 has an upper main face and a lower main face. The vibration part 24 is disposed around the fixing part 22 as viewed in the up-down direction (normal direction of the fixing part 22). More specifically, the vibration part 24 surrounds a part of the fixing part 22 as viewed in the up-down direction (normal direction of the fixing part 22). In the present specification, "the vibration part 24 surrounds a part of the fixing part 22" means that the vibration part 24 circles a part of the fixing part 22. The vibration part 24 may have a frame shape or may have a shape in which a part of the frame shape is cut out. In the present embodiment, the vibration part 24 has a shape in which a part of a rectangular frame shape is cut out. The vicinity of the center of the right side of the vibration part 24 is cut out. Hereinafter, a region surrounded by the vibration part 24 is defined as a surrounded region A1.

The fixing part body 222 is disposed in the surrounded region A1 as viewed in the up-down direction (normal direction of the fixing part 22). The fixing part body 222 is disposed at the right end part of the surrounded region A1. Note that the fixing part body 222 is not in contact with the vibration part 24. The fixing part protrusion 224 protrudes from the surrounded region A1 as viewed in the up-down direction (normal direction of the fixing part 22). The fixing part protrusion 224 passes through the cutting out provided near the center of the right side of the vibration part 24 in the left-right direction. Note that the fixing part protrusion 224 is not in contact with the vibration part 24.

The vibration part 24 is fixed to the operation target 4. Specifically, the adhesive members 10a, 10b are provided on the upper main face of the vibration part 24. The adhesive member 10a extends in the left-right direction along the front side of the vibration part 24. The adhesive member 10b extends in the left-right direction along the back side of the vibration part 24. The adhesive members 10a, 10b are attached to the lower main face of the operation target 4. Thus, the vibration part 24 is fixed to the operation target 4. As a result, the operation target 4 overlaps at least a part of the vibration part 24 and at least a part of the fixing part body 222 as viewed in the up-down direction (normal direction of the fixing part 22). The adhesive members 10a, 10b are, for example, double-sided tapes.

The coupling parts 28a, 28b couple the vibration part 24 and the fixing part 22. When the coupling parts 28a, 28b elastically deform, the vibration part 24 is displaced in the left-right direction (orthogonal direction orthogonal to the normal direction of the fixing part 22) with respect to the fixing part 22. More specifically, the coupling parts 28a, 28b are disposed in the surrounded region A1 as viewed in the up-down direction. The coupling part 28a has a linear shape extending in the front-back direction. The front end of the coupling part 28a is connected to the right end part of the front side of the vibration part 24. The back end of the coupling part 28a is connected to the left end part of the fixing part 22. The coupling part 28b has a linear shape extending in the front-back direction. The back end of the coupling part 28b is connected to the right end part of the back side of the fixing part 22. The front end of the coupling part 28a is connected to the left end part of the vibration part 24. The line widths of the coupling parts 28a, 28b are thin. Therefore, the coupling parts 28a, 28b can easily elastically deform. This enables the vibration part 24 to be displaced in the left-right direction with respect to the fixing part 22.

The fixing part 22, the vibration part 24, and the coupling parts 28a, 28b as described above are formed of an integral metal plate. The metal plate may be coated with a resin such as polyimide. This gives an insulation treatment to the metal plate. The fixing part 22, the vibration part 24, and the coupling parts 28a, 28b may be a member made of a single material other than metal (for example, acrylic resin, PET, polycarbonate, glass epoxy, FRP, metal, glass, or the like).

The vibration film 26 is fixed to the vibration part 24 and the fixing part 22. The vibration film 26 vibrates the vibration part 24 in the left-right direction (orthogonal direction) with respect to the fixing part 22 when an electric signal is applied. More specifically, the vibration film 26 has an upper main face and a lower main face. The vibration film 26 has a rectangular shape having long sides extending in the left-right direction as viewed in the up-down direction. The vibration film 26 is disposed under the fixing part 22 and the vibration part 24. The vibration film 26 is fixed to the fixing part body 222. Specifically, the right end part of the upper main face of the vibration film 26 is fixed to the lower main face of the fixing part body 222 by a double-sided tape 30a. The left end part of the upper main face of the vibration film 26 is fixed to the lower main face of the left side of the vibration part 24 by a double-sided tape 30b. At this time, the vibration film 26 is stretched between the fixing part body 222 and the left side of the vibration part 24 such that the vibration film 26 pulls the fixing part body 222 in the left direction and pulls the left side of the vibration part 24 in the right direction. Therefore, a tension is generated in the vibration film 26 such that the vibration film 26 contracts in the left-right direction.

The vibration film 26 vibrates in the left-right direction when an electric signal having a voltage changing at a predetermined frequency is applied. Therefore, the vibration film 26 is a piezoelectric film. The vibration film 26 is, for example, a film made of polyvinylidene fluoride (PVDF). The vibration film 26 may be, for example, a film made of a chiral polymer. The chiral polymer contains polylactic acid. The polylactic acid includes poly-L-lactic acid (PLLA), poly-D-lactic acid (PDLA), or the like.

An electrode (not illustrated) is provided on each of the upper main face of the vibration film 26 and the lower main face of the vibration film 26. The drive circuit 50 is electrically connected to the electrode provided on the upper main face of the vibration film 26 and the electrode provided on the lower main face of the vibration film 26. The drive circuit 50 applies an electric signal to the electrode provided on the upper main face of the vibration film 26 and the electrode provided on the lower main face of the vibration film 26. The vibration film 26 stretches and contracts in the left-right direction according to the electric signal. Polylactic acid makes shear deformation according to the voltage of the electric signal. Therefore, when polylactic acid is used for the vibration film 26, the film is cut such that the stretching direction of the vibration film 26 is inclined by about 45°±10° with respect to the left-right direction. This allows the vibration film 26 to stretch and contract in the left-right direction.

[Effects]

The vibration device 20 can transmit vibration to a user more efficiently. More specifically, the fixing part 22 is fixed to the electronic equipment body 6. The vibration part 24 is fixed to the operation target 4. Then, the vibration film 26 vibrates the vibration part 24 in the left-right direction with respect to the fixing part 22 when an electric signal is applied to the vibration film 26. This causes the vibration of the vibration part 24 to directly transmit to the operation target 4 that a part of the user's body touches. As a result, the vibration device 20 can transmit vibration to the user more efficiently.

The vibration device 20 can transmit vibration to a user more efficiently. More specifically, the vibration part 24 is disposed around the fixing part 22 as viewed in the up-down direction. Therefore, the fixing part 22 is not present around the vibration part 24. As a result, the design of the outer peripheral part of the vibration part 24 is less restricted by the fixing part 22. That is, the degree of freedom in designing the vibration part 24 increases. As a result, it becomes easy to design the vibration part 24 into a structure in which the vibration part 24 easily vibrates. Therefore, the vibration device 20 can transmit vibration to the user more efficiently.

According to the vibration device 20, the fixing part 22, the vibration part 24, and the coupling parts 28a and 28b are formed of one metal plate. Thus, the fixing part 22, the vibration part 24, and the coupling parts 28a, 28b can be formed by punching a single metal plate. As a result, the fixing part 22, the vibration part 24, and the coupling parts 28a, 28b can be easily formed.

The vibration device 20 can downsize the electronic equipment 1. More specifically, the electronic equipment body 6 surrounds at least a part of the operation target 4 as viewed in the up-down direction. The operation target 4 overlaps at least a part of the vibration part 24 and at least a part of the fixing part body 222 as viewed in the up-down direction. Thus, most of the vibration device 20 overlaps the operation target 4 as viewed in the up-down direction. As a result, downsizing of the electronic equipment 1 is achieved.

(Modifications)

Figure 6:
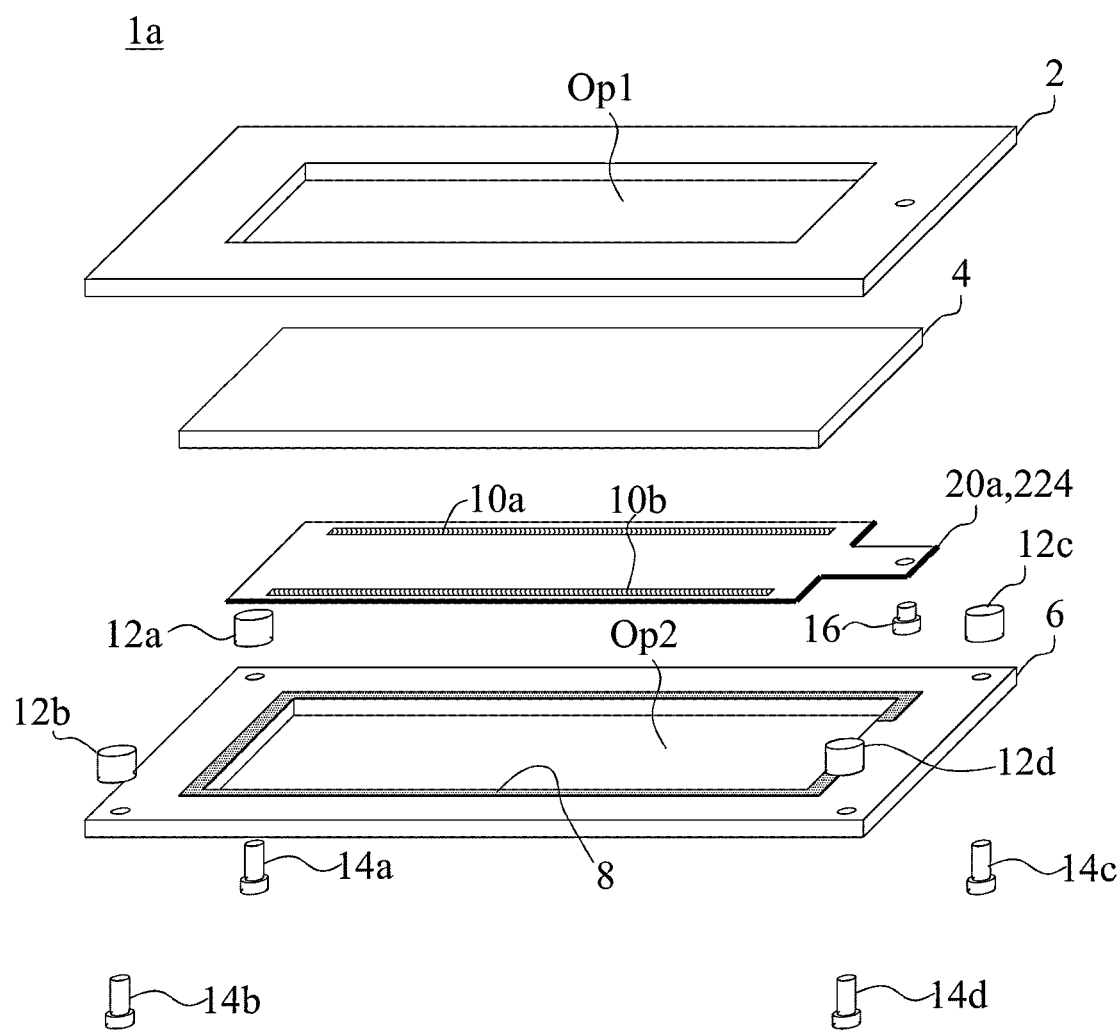
Figure 6:
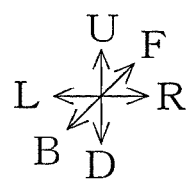

Hereinafter, a vibration device 20a according to a first modification will be described with reference to the drawings. FIG. 6 is an exploded perspective view of electronic equipment 1a including the vibration device 20a.

The electronic equipment 1a is different from the electronic equipment 1 in the structure of the operation target 4 and the point that the vibration device 20a is fixed to the electronic equipment body 2. Hereinafter, the electronic equipment 1a will be described focusing on these differences.

The operation target 4 has a structure in which a glass plate, a touch pad type input device, and a liquid crystal panel are stacked in this order from the top to the bottom. The operation target 4 is a touch pad type input device having a display function.

The vibration device 20a is fixed to the electronic equipment body 2. More specifically, the fixing part protrusion 224 is fixed to the electronic equipment body 2. The fixing part protrusion 224 is fixed to the electronic equipment body 2 by the screw 16. A double-sided tape may be used instead of the screw 16 to fix the fixing part protrusion 224. Other structures of the electronic equipment 1a are the same as those of the electronic equipment 1, and thus description thereof is omitted.

The fixing part protrusion 224 protrudes from the surrounded region A1 as viewed in the up-down direction. Thus, the operation target 4 and the vibration part 24 are not present above or below a part of the fixing part protrusion 224. As a result, the fixing part protrusion 224 can be fixed to the electronic equipment body 6 like in the electronic equipment 1 or can be fixed to the electronic equipment body 2 like in the electronic equipment 1a.

(Other Embodiments)

The vibration device according to the present invention is not limited to the vibration devices 20, 20a described above and can be modified within the scope of the gist thereof. In addition, the structure of the vibration device 20 and the structure of the vibration device 20a may be combined.

In the vibration devices 20, 20a, the vibration part 24 does not have to have a shape in which a part of the rectangular frame shape is cut out. It is sufficient that the vibration part 24 is disposed around the fixing part 22 as viewed in the up-down direction. The vibration part 24 may have, for example, a structure having a front side and a back side and not having a left side or a right side. That is, the vibration part 24 may be two rectangular members extending in the left-right direction.

In the vibration devices 20, 20a, the fixing part 22, the vibration part 24, and the coupling parts 28a, 28b do not have to be formed of one member. That is, the fixing part 22 and the vibration part 24 may be connected by coupling parts 28a, 28b that are elastic bodies such as springs and rubber.

In the vibration devices 20, 20a, the fixing part 22 does not have to include the fixing part protrusion 224. In this case, the fixing part body 222 is fixed to the electronic equipment body 2 or the electronic equipment body 6.

In the vibration devices 20 and 20a, the opening Op2 is not an essential component. For example, it is sufficient that the thickness of the cushion material 8 is larger than the thickness of the vibration device 20. This eliminates an inhibition of vibration with the vibration device 20 contacting with the electronic equipment body 6 when the user presses the electronic equipment body 6. When the opening Op2 is not present, the thickness of the electronic equipment 1, 1a increases, but it is possible to decrease the influence on the vibration film 26 by heat, noise, or the like from the outside of the electronic equipment 1, 1a.

In the vibration devices 20, 20a, a recess may be provided instead of the opening Op2. The vibration devices 20, 20a provided with a recess can also exhibit the same operation and effect as the vibration devices 20, 20a provided with the opening Op2. In the vibration devices 20, 20a provided with a recess, the thicknesses of the vibration devices 20, 20a decreases.

The entire part (rectangular part) of the vibration device 20 excluding the fixing part 22 preferably overlaps the opening Op2 as viewed in the up-down direction. This eliminates an inhibition of vibration of the vibration part 24 with the vibration device 20 contacting with the electronic equipment body 6 when the user presses the electronic equipment body 6.

DESCRIPTION OF REFERENCE SYMBOLS 1, 1a: Electronic equipment
2, 6: Electronic equipment body
4: Operation target
8: Cushion material
10a, 10b: Adhesive member
12a to 12d: Spacer
14a to 14d, 16: Screw
20, 20a: Vibration device
22: Fixing part
24: Vibration part
26: Vibration film
28a, 28b: Coupling part
30a, 30b: Double-sided tape
50: Drive circuit
222: Fixing part body
224: Fixing part protrusion
A1: Surrounded region
Op1, Op2: Opening

The invention claimed is:

1. A vibration device comprising:
a fixing part having a flat plate shape;
a vibration part having a flat plate shape, the vibration part being disposed around the fixing part as viewed in a normal direction of the fixing part;
a coupling part that couples the vibration part and the fixing part and is constructed to elastically deform, the vibration part constructed to be displaced in an orthogonal direction orthogonal to the normal direction of the fixing part with respect to the fixing part; and
a vibration film fixed to the vibration part and the fixing part, the vibration film constructed to vibrate the vibration part in the orthogonal direction with respect to the fixing part when an electric signal is applied to the vibration film.

2. The vibration device according to claim 1, wherein
the vibration part surrounds a part of the fixing part as viewed in the normal direction of the fixing part,
the fixing part includes (1) a fixing part body disposed in a surrounded region surrounded by the vibration part as viewed in the normal direction of the fixing part and (2) a fixing part protrusion protruding from the surrounded region as viewed in the normal direction of the fixing part,
the vibration film is fixed to the fixing part body.

3. The vibration device according to claim 1, wherein the fixing part, the vibration part, and the coupling part comprise an integral metal plate.

4. The vibration device according to claim 1, wherein the vibration film is a piezoelectric film.

5. The vibration device according to claim 4, wherein the piezoelectric film is a film made of polyvinylidene fluoride.

6. The vibration device according to claim 4, wherein the piezoelectric film is a film made of a chiral polymer.

7. Electronic equipment comprising:
an electronic equipment body;
an operation target; and
a vibration device;
wherein the vibration device includes:
a fixing part that is fixed to the electronic equipment body and has a flat plate shape;
a vibration part that is fixed to the operation target and has a flat plate shape, the vibration part being disposed around the fixing part as viewed in a normal direction of the fixing part;
a coupling part that couples the vibration part and the fixing part and is constructed to elastically deform, the vibration part constructed to be displaced in an orthogonal direction orthogonal to the normal direction of the fixing part with respect to the fixing part; and a vibration film fixed to the vibration part and the fixing part, the vibration film constructed to vibrate the vibration part in the orthogonal direction with respect to the fixing part when an electric signal is applied to the vibration film.

8. The electronic equipment according to claim 7, wherein the vibration part surrounds a part of the fixing part as viewed in the normal direction of the fixing part, the fixing part includes (1) a fixing part body disposed in a surrounded region surrounded by the vibration part as viewed in the normal direction of the fixing part and (2) a fixing part protrusion protruding from the surrounded region as viewed in the normal direction of the fixing part, the vibration film is fixed to the fixing part body, and the fixing part protrusion is fixed to the electronic equipment body.

9. The electronic equipment according to claim 8, wherein the electronic equipment body surrounds at least a part of the operation target as viewed in the normal direction of the fixing part, and the operation target overlaps at least a part of the vibration part and at least a part of the fixing part body as viewed in the normal direction of the fixing part.

10. The electronic equipment according to claim 8, wherein the operation target overlaps at least a part of the vibration part and at least a part of the fixing part body as viewed in the normal direction of the fixing part.

11. The electronic equipment according to claim 7, wherein the fixing part, the vibration part, and the coupling part comprise an integral metal plate.

12. The electronic equipment according to claim 7, wherein the vibration film is a piezoelectric film.

13. The electronic equipment according to claim 12, wherein the piezoelectric film is a film made of polyvinylidene fluoride.

14. The electronic equipment according to claim 12, wherein the piezoelectric film is a film made of a chiral polymer.

15. The electronic equipment according to claim 7, further comprising a drive circuit that applies the electric signal to the vibration film.

* * * * *